United States Patent
Ito et al.

(10) Patent No.: US 12,417,720 B2
(45) Date of Patent: Sep. 16, 2025

(54) DISPLAY DEVICE AND MULTI-DISPLAY

(71) Applicant: KYOCERA Corporation, Kyoto (JP)

(72) Inventors: Hiroaki Ito, Kyoto (JP); Katsumi Aoki, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 11 days.

(21) Appl. No.: 18/689,750

(22) PCT Filed: Sep. 8, 2022

(86) PCT No.: PCT/JP2022/033800
§ 371 (c)(1),
(2) Date: Oct. 25, 2024

(87) PCT Pub. No.: WO2023/038096
PCT Pub. Date: Mar. 16, 2023

(65) Prior Publication Data
US 2025/0054420 A1 Feb. 13, 2025

(30) Foreign Application Priority Data
Sep. 9, 2021 (JP) ................................ 2021-147054

(51) Int. Cl.
*G09G 3/04* (2006.01)
*G06F 1/16* (2006.01)
(Continued)

(52) U.S. Cl.
CPC .......... *G09F 9/3023* (2013.01); *G06F 1/1647* (2013.01); *G09F 9/301* (2013.01); *G09F 9/33* (2013.01)

(58) Field of Classification Search
CPC ........ G06F 1/1647; G06F 3/1446; G09F 3/00; G09F 3/30; G09F 3/301; G09F 3/3023; G09F 3/3026; G09G 2300/026
See application file for complete search history.

(56) References Cited

U.S. PATENT DOCUMENTS 6,483,482 B1 * 11/2002 Kim .................... G02F 1/13336
345/1.3
10,223,059 B2 * 3/2019 Watanabe ........... G02F 1/13452
(Continued)

FOREIGN PATENT DOCUMENTS

JP 2018-141944 A 9/2018

*Primary Examiner* — Joe H Cheng
(74) *Attorney, Agent, or Firm* — Procopio, Cory, Hargreaves & Savitch LLP

(57) ABSTRACT

A multi-display includes a first display device and a second display device. The first display device includes a first substrate including a first display surface and a first side surface continuous with the first display surface, a first display portion on the first display surface, and a first side wiring extending from the first side surface to the first display surface. The second display device includes a second substrate including a second display surface and a second side surface continuous with the second display surface, a second display portion on the second display surface, and a second side wiring extending from the second side surface to the second display surface. The first side surface and the second side surface are adjacent to and face each other. The first side wiring and the second side wiring are located without facing each other.

19 Claims, 9 Drawing Sheets

(51) Int. Cl.
  *G09F 9/30*   (2006.01)
  *G09F 9/302*  (2006.01)
  *G09F 9/33*   (2006.01)

(56) References Cited

U.S. PATENT DOCUMENTS

| | | | |
|---|---|---|---|
| 11,247,439 B2* | 2/2022 | Takagishi | B32B 27/285 |
| 11,882,728 B2* | 1/2024 | Kim | H10K 77/111 |
| 2010/0277443 A1* | 11/2010 | Yamazaki | G09G 5/003 |
| | | | 345/100 |
| 2017/0031643 A1* | 2/2017 | Jeong | G06F 1/1647 |
| 2018/0174973 A1* | 6/2018 | Aoyagi | H10F 77/933 |
| 2018/0188579 A1* | 7/2018 | Jeong | G02F 1/133345 |
| 2020/0013803 A1* | 1/2020 | Jang | H10D 86/441 |
| 2020/0133614 A1* | 4/2020 | Oh | G06F 3/1446 |
| 2020/0303608 A1* | 9/2020 | Song | H05K 3/403 |
| 2021/0111162 A1* | 4/2021 | Takeya | H10H 20/857 |
| 2024/0055442 A1* | 2/2024 | Ito | H10D 86/60 |

* cited by examiner

DISPLAY DEVICE AND MULTI-DISPLAY

This application is the National Stage of PCT/JP2022/033800 filed on Sep. 8, 2022, which claims priority from Japanese Patent Application No. JP2021-147054 filed on Sep. 9, 2021, the entire contents of which are hereby incorporated by reference into this application.

TECHNICAL FIELD

The present disclosure relates to a display device and a multi-display (combined display device).

BACKGROUND OF INVENTION

A known display device and a known multi-display are described in, for example, Patent Literature 1.

CITATION LIST

Patent Literature

Patent Literature 1: Japanese Unexamined Patent Application Publication No. 2018-141944

SUMMARY

In an aspect of the present disclosure, a multi-display includes a first display device including a first substrate including a first display surface and a first side surface continuous with the first display surface, a first display portion on the first display surface, and a first side wiring extending from the first side surface to the first display surface, and a second display device including a second substrate including a second display surface and a second side surface continuous with the second display surface, a second display portion on the second display surface, and a second side wiring extending from the second side surface to the second display surface. The first side surface and the second side surface are adjacent to and face each other. The first side wiring and the second side wiring are located without facing each other.

In an aspect of the present disclosure, a display device includes a substrate including a display surface, a side surface continuous with the display surface, and an opposite side surface opposite to the side surface, a display portion on the display surface, a side wiring extending from the side surface to the display surface, and an opposite side wiring extending from the opposite side surface to the display surface. The side wiring and the opposite side wiring are located without facing each other.

BRIEF DESCRIPTION OF THE DRAWINGS

The objects, features, and advantages of the present disclosure will become more apparent from the following detailed description and the drawings.

DESCRIPTION OF EMBODIMENTS

A display device with the structure that forms the basis of a display device according to one or more embodiments of the present disclosure will now be described.

As the display device with the structure that forms the basis of the display device according to one or more embodiments of the present disclosure, for example, Patent Literature 1 describes multiple display devices joined into a combined large display device as a multi-display.

In a known multi-display, for example, a wiring La such as a side wiring on a joined side surface (tiled side surface) between a display device A and a display device B adjacent to the display device A and a wiring Lb on a joined side surface of the display device B may come into contact with each other, causing electrical short-circuiting. Additionally, the wiring La and the wiring Lb may, for example, come into contact with or hit each other, and thus can deteriorate, or for example, be damaged, break, or come off. The wiring La and the side surface of the display device B may, for example, come into contact with or hit each other, or the wiring Lb and the side surface of the display device A may, for example, come into contact with or hit each other. The wiring La and the wiring Lb can thus deteriorate, or for example, be damaged, break, or come off. The wiring La and the side surface of the display device B remaining in contact with each other and the wiring Lb and the side surface of the display device A remaining in contact with each other may be, for example, displaced, rubbed at their contact portions, or pressed by, for example, vibration or thermal expansion. This can apply stress to the contact portions and cause similar deterioration. With the wiring La and the wiring Lb, the space between the display device A and the display device B tends to be large, causing the joint (tiled portion) between the display device A and the display device B to be more noticeable. This may lower the operational reliability and the long-term reliability of the multi-display as well as the display quality of the multi-display.

The display device and a multi-display according to one or more embodiments of the present disclosure will now be described with reference to the accompanying drawings. Each figure referred to below illustrates main components and other elements of the display device and the multi-display according to one or more embodiments of the present disclosure. In the embodiments of the present disclosure, the display device and the multi-display may include known components not illustrated in the figures, such as circuit boards, wiring conductors, control integrated circuits (ICs), and large-scale integration (LSI) circuits. The figures referred to below are schematic, and are not drawn to scale relative to, for example, the actual shapes, positions, and dimensions of components of the display device and the multi-display.

Figure 1:
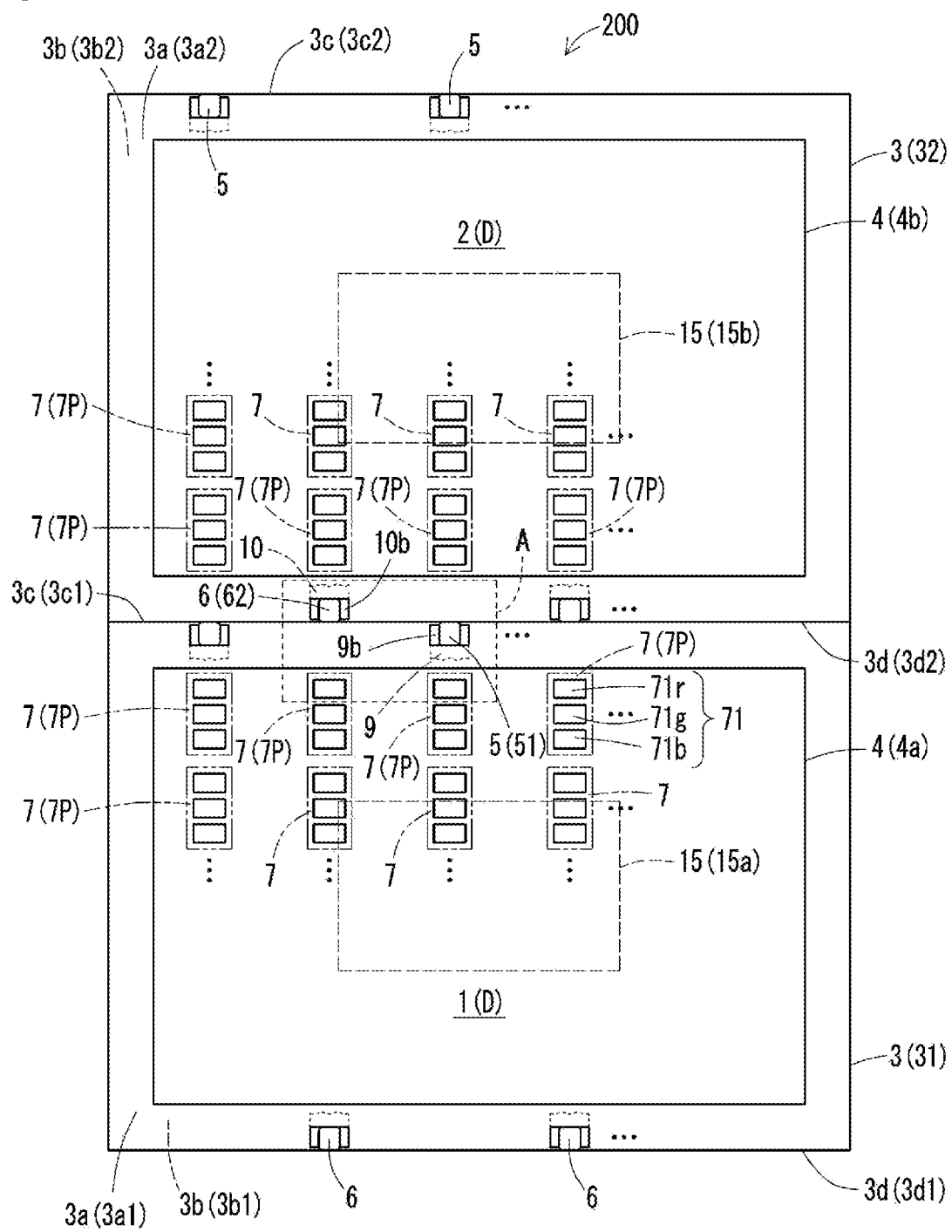
FIG. 1 is a plan view of a multi-display according to one embodiment of the present disclosure.
Figure 2:
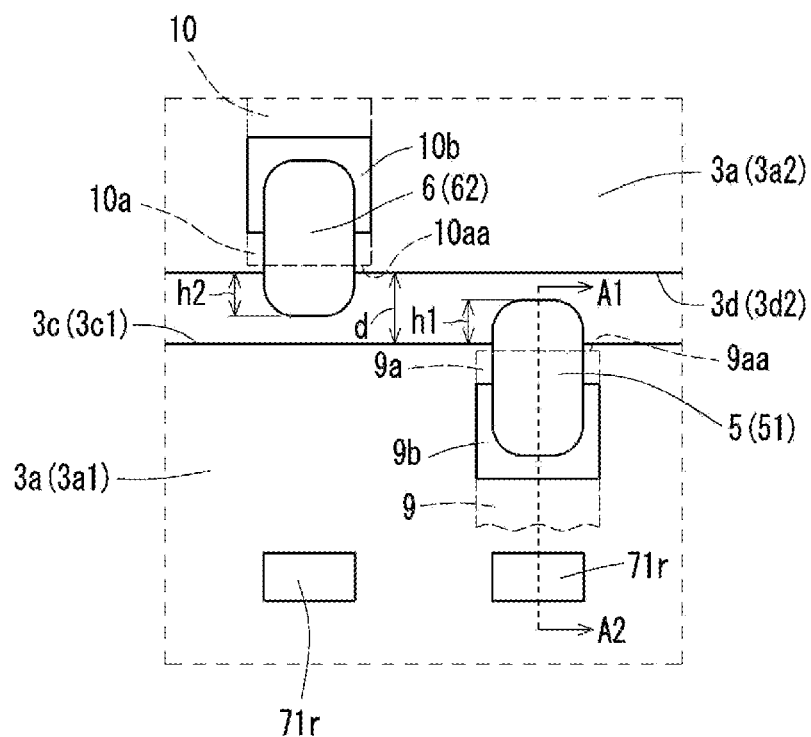
FIG. 2 is a plan view of the multi-display in FIG. 1, illustrating its main part in an enlarged manner.

FIGS. 1 to 12 are views of multi-displays according to various embodiments of the present disclosure. FIGS. 1, 2, 4, 6, 7, 8, and 12 do not illustrate an insulating substrate that is a stack of insulating layers including an internal wiring located on the first surface of a substrate. FIG. 2 is an enlarged view of part A in FIG. 1. The plan views in FIGS. 4, 6, and 7 correspond to the plan view in FIG. 2.

In the present embodiment, a multi-display 200 includes a first display device 1 and a second display device 2. The first display device 1 includes a first substrate 31, a first display portion 4a, and a first side wiring 5. The second display device 2 includes a second substrate 32, a second display portion 4b, and a second side wiring 6. The first display device 1 and the second display device 2 may be hereafter collectively referred to as display devices D. The first substrate 31 and the second substrate 32 may be hereafter collectively referred to as substrates 3. The first display portion 4a and the second display portion 4b may be hereafter collectively referred to as display portions 4.

A first display surface 3a1 of the first substrate 31 and a second display surface 3a2 of the second substrate 32 may be collectively referred to as display surfaces 3a. A first non-display surface 3b1 of the first substrate 31 and a second non-display surface 3b2 of the second substrate 32 may be collectively referred to as non-display surfaces 3b. A first side surface 3c1 of the first substrate 31 may be referred to as a side surface 3c. A first opposite side surface 3d1 of the first substrate 31 and a second opposite side surface 3d2 of the second substrate 32 may be collectively referred to as opposite side surfaces 3d. A first drive 15a in the first display device 1 and a second drive 15b in the second display device 2 may be collectively referred to as drives 15.

In other words, the display surfaces 3a are the front surfaces of the substrates 3, and the non-display surfaces 3b are the back surfaces of the substrates 3. In other words, the opposite side surface 3d of each substrate 3 is a side surface (facing side surface) facing the side surface 3c of another substrate 3.

In the present embodiment, as illustrated in FIG. 1, the multi-display 200 includes the first display device 1 and the second display device 2. The first display device 1 includes the first substrate 31 including the first display surface 3a1 and the first side surface 3c1 continuous with the first display surface 3a1, the first display portion 4a on the first display surface 3a1, and the first side wiring 5 extending from the first side surface 3c1 to the first display surface 3a1. The second display device 2 includes the second substrate 32 including the second display surface 3a2 and the second side surface (second opposite side surface) 3d2 continuous with the second display surface 3a2, the second display portion 4b on the second display surface 3a2, and the second side wiring 6 extending from the second side surface 3d2 to the second display surface 3a2. The first side surface 3c1 and the second side surface 3d2 are adjacent to and face each other. The first side wiring 5 and the second side wiring 6 are located without facing each other.

The above structure produces the effects described below. The first display device 1 and the second display device 2 can be located adjacent to each other. This reduces variations in the pixel pitch of the multi-display 200 at the joint between the first display device 1 and the second display device 2 when the pixel pitch of the first display device 1 and the second display device 2 is relatively small, thus improving the display quality of the multi-display 200. The structure reduces the likelihood of electrical short-circuiting caused by the first side wiring 5 and the second side wiring 6 coming into contact with each other. The structure reduces the likelihood that the first side wiring 5 and the second side wiring 6, for example, come into contact with or hit each other and deteriorate, or for example, are damaged, break, or come off. The structure reduces the likelihood that the first side wiring 5 and the second side surface 3d2 of the second substrate 32, for example, come into contact with or hit each other, and also reduces the likelihood that the second side wiring 6 and the first side surface 3c1 of the first substrate 31, for example, come into contact with or hit each other. This reduces the likelihood that the first side wiring 5 and the second side wiring 6 deteriorate, or for example, are damaged, break, or come off. The first side wiring 5 and the second side surface 3d2 of the second substrate 32 remaining in contact with each other and the second side wiring 6 and the first side surface 3c1 of the first substrate 31 remaining in contact with each other may be, for example, displaced, rubbed at their contact portions, or pressed by, for example, vibration or thermal expansion. This can apply stress to the contact portions, and cause similar deterioration. The above structure can respond to such an issue. The space (joint) between the first display device 1 and the second display device 2 can be smaller, thus allowing the joint to be less noticeable. The multi-display 200 can thus have higher operational reliability and long-term reliability, and have higher display quality.

In the example illustrated in FIG. 1, the first side surface 3c1 of the first substrate 31 is a side surface (joined side surface) to be joined, and the second side surface (second opposite side surface) 3d2 of the second substrate 32 is a side surface (joined side surface) to be joined. However, the structure is not limited to this example. For example, when the first substrate 31 and the second substrate 32 are squares, a side surface of the second substrate 32 adjacent to the second side surface 3d2 may be a joined side surface. The side surface 3c2 of the second substrate 32 is a non-joined side surface opposite to the second side surface 3d2.

Each substrate 3 may be, for example, a square plate, a rectangular plate, a parallelogram plate, a trapezoidal plate, a hexagonal plate, an octagonal plate, or a plate with any other shape. In the examples described below, the substrate 3 is a rectangular plate.

The substrate 3 in one display device includes the display surface (one main surface) 3a, the non-display surface (the other main surface) 3b opposite to the display surface 3a, the side surface 3c continuous with the display surface 3a, and the opposite side surface 3d opposite to the side surface 3c. As illustrated in FIG. 1, the first side surface 3c1 of the first substrate 31 in the first display device 1 corresponds to the side surface 3c of the substrate 3. The second side surface 3d2 of the second substrate 32 in the second display device 2 corresponds to the opposite side surface 3d of the substrate 3. The side surface 3c2 of the second substrate 32 in the second display device 2 corresponds to the side surface 3c of the substrate 3. In other words, the second substrate 32 is located in an orientation opposite to the orientation of the first substrate 31 as viewed in plan. In other words, the second substrate 32 is in an orientation rotated by 180° relative to the first substrate 31. In this case, the positional relationship between light emitters 71r, 71g, and 71b arranged on the first display surface 3a1 of the first substrate 31 may be the same as the positional relationship between light emitters 71r, 71g, and 71b arranged on the second display surface 3a2 of the second substrate 32. Thus, the first side surface 3c1 of the first substrate 31 in the first display device 1 corresponds to the side surface 3c of the substrate 3 and is also a joined side surface. The second side surface 3d2 of the second substrate 32 in the second display device 2 corresponds to the opposite side surface 3d of the substrate 3 and is also a joined side surface.

Although the side surface 3c and the opposite side surface 3d each includes a long side of the display surface 3a in the examples described below, the side surface 3c and the opposite side surface 3d may each include a short side of the display surface 3a.

Figure 3:
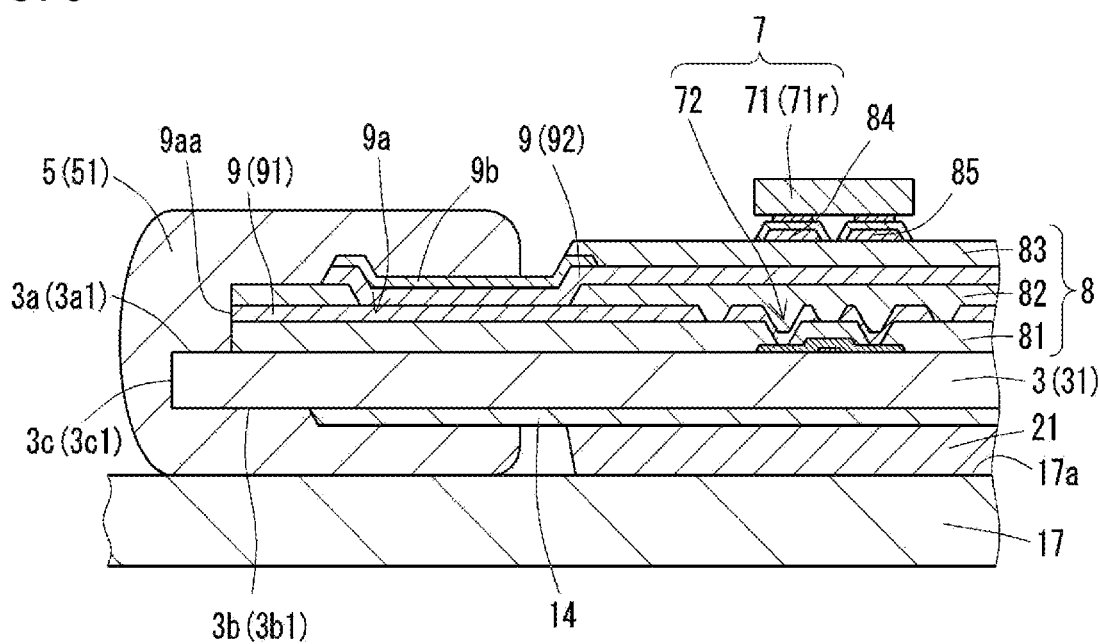
FIG. 3 is a cross-sectional view taken along line A1-A2 in FIG. 2.

The multi-display 200 may include a base substrate 17 (illustrated in FIG. 3). The first display device 1 may be fixed on the base substrate 17 with the first non-display surface 3b1 of the first substrate 31 facing one main surface 17a of the base substrate 17. The second display device 2 may be fixed on the base substrate 17 with the second non-display surface 3b2 of the second substrate 32 facing one main surface 17a of the base substrate 17. The first display device 1 and the second display device 2 may be fixed on one main surface 17a of the base substrate 17 with a fixing member (not illustrated) such as an adhesive or screws. The first display device 1 may be fitted into a frame, which may be fixed on the base substrate 17 by bonding with an adhesive or may be mechanically fixed on the base substrate 17 with, for example, screws, a fitting member, or an engagement member. The second display device 2 may also be fixed on the base substrate 17 with the same or similar fixing method.

The first display device 1 may include a heat dissipator such as a cooling pipe or a heat-dissipating fin on the first non-display surface 3b1 of the first substrate 31. The cooling pipe may allow a refrigerant such as air or water to pass or circulate through the pipe. The second display device 2 may also include the same or similar heat dissipator.

In the multi-display 200, the first display surface 3a1 may be flush with the second display surface 3a2. In the multi-display 200, the first display surface 3a1 and the second display surface 3a2 may not be parallel to each other. For example, the display surfaces 3a of many display devices may collectively form a surface curved outward or a surface curved inward.

The substrates 3 may be made of, for example, a glass material, a ceramic material, or a resin material. Examples of the glass material used for the substrates 3 include borosilicate glass, crystallized glass, and quartz. Examples of the ceramic material used for the substrates 3 include alumina ($Al_2O_3$), zirconia ($ZrO_2$), silicon nitride ($Si_3N_4$), silicon carbide (SiC), and aluminum nitride (AlN). Examples of the resin material used for the substrates 3 include an epoxy resin, a polyimide resin, a polyamide resin, an acrylic resin, and a polycarbonate resin.

The substrates 3 may be made of, for example, a metal material, an alloy material, or a semiconductor material. Examples of the metal material used for the substrates 3 include aluminum (Al), magnesium (Mg) (specifically, high-purity magnesium with a Mg content of 99.95% or higher), zinc (Zn), tin (Sn), copper (Cu), chromium (Cr), and nickel (Ni). Examples of the alloy material used for the substrates 3 include duralumin, which is an aluminum alloy containing aluminum as a main component (an Al—Cu alloy, an Al—Cu—Mg alloy, or an Al—Zn—Mg—Cu alloy), a magnesium alloy containing magnesium as a main component (a Mg—Al alloy, a Mg—Zn alloy, or a Mg—Al—Zn alloy), titanium boride, stainless steel, and a Cu—Zn alloy.

Examples of the semiconductor material used for the substrates 3 include silicon (Si), germanium (Ge), and gallium arsenide (GaAs).

Each display portion 4 is located on the display surface 3a of the corresponding substrate 3. The display portion 4 includes multiple pixels 7. The multiple pixels 7 may be in a matrix as viewed in plan as illustrated in, for example, FIG. 1. As illustrated in, for example, FIG. 3, the display portion 4 may include an insulating substrate 8 on the display surface 3a and multiple pixels 7 in and on the insulating substrate 8.

The insulating substrate 8 may include a single insulating layer, or may be a stack of multiple insulating layers. In the present embodiment, the insulating substrate 8 includes multiple insulating layers 81, 82, and 83 stacked on one another as illustrated in, for example, FIG. 3. The insulating layers 81, 82, and 83 may be made of, for example, silicon oxide ($SiO_2$) or silicon nitride ($Si_3N_4$). The insulating substrate 8 may include an insulating layer made of an organic resin, such as an acrylic resin layer or a polycarbonate resin layer.

The multiple pixels 7 may each include light emitters 71 and a pixel circuit 72 for driving the light emitters 71.

Each light emitter 71 may be, for example, a self-luminous light emitter such as a light-emitting diode (LED) or a semiconductor laser diode (LD). Each light emitter 71 may be a micro-light-emitting diode (μLED). The light emitter 71 being a μLED may be rectangular as viewed in a direction orthogonal to the light-emitting surface of the light emitter 71, with each side having a length of about 1 to 100 μm or about 5 to 20 μm. A range of values referred to herein as one value to another value intends to mean the two values being inclusive.

In the present embodiment, each pixel 7 includes multiple light emitters 71 as illustrated in, for example, FIG. 1. The light emitters 71 may include, for example, the light emitter 71r that emits red light, the light emitter 71g that emits green light, and the light emitter 71b that emits blue light. This allows the multi-display 200 to display full-color gradations.

Each pixel 7 may include, in addition to the light emitters 71r, 71g, and 71b, at least one of a light emitter 71 that emits yellow light or a light emitter 71 that emits white light. This improves the color rendering and color reproduction of the multi-display 200. Each pixel 7 may include a light emitter 71 that emits orange, red-orange, red-violet, or violet light in place of the light emitter 71r that emits red light. Each pixel may include a light emitter 71 that emits yellow-green light in place of the light emitter 71g that emits green light.

The pixel circuit 72 includes, for example, a thin-film transistor (TFT) and a wiring conductor. In FIG. 3, the TFT included in the pixel circuit 72 alone is illustrated. The TFT may include a semiconductor film of, for example, amorphous silicon (a-Si) or low-temperature polycrystalline silicon (LTPS), and three terminals that are a gate electrode, a source electrode, and a drain electrode. The TFT serves as a switching element that switches conduction and non-conduction between the source electrode and the drain electrode based on the voltage applied to the gate electrode. The pixel circuit 72 may be located on the display surface 3a of the substrate 3 or between the multiple insulating layers 81, 82, and 83 in the insulating substrate 8. The pixel circuit 72 may be formed using a thin film formation method such as chemical vapor deposition (CVD).

The light emitter 71 being a two-terminal element, such as a μLED, may be connected to an anode electrode 84 and a cathode electrode 85 on the insulating substrate 8 by flip-chip connection. The anode electrode 84 and the cathode electrode 85 may include surfaces facing the light emitter 71 covered with a transparent conductor such as indium tin oxide (ITO) or indium zinc oxide (IZO). The light emitter 71 may be electrically and mechanically connected to the anode electrode 84 and the cathode electrode 85 by flip-chip connection using conductive connectors, such as an anisotropic conductive film (ACF), solder balls, metal bumps, or a conductive adhesive. The light emitter 71 may be electrically connected to the anode electrode 84 and the cathode electrode 85 using conductive connectors such as bonding wires.

For the substrate 3 made of a metal material, an alloy material, or a semiconductor material, an insulating layer made of, for example, silicon oxide ($SiO_2$) or silicon nitride ($Si_3N_4$) may be located between the display surface 3a of the substrate 3 and the display portion 4. This reduces short-circuiting between components such as the TFTs and the wiring conductors in the pixel circuits 72 through the substrate 3.

The first display device 1 may include a first wiring 9 on the first display surface 3a1. The first wiring 9 may be located at the edge adjacent to the first side surface 3c1 as illustrated in, for example, FIGS. 1 and 2. The first wiring 9 may be located in the insulating substrate 8 or on the insulating substrate 8. The first wiring 9 may be a single set of wiring located in the insulating substrate 8, or may include multiple sets 91 and 92 of first wiring each located between different layers of the multiple insulating layers 81, 82, and 83 as illustrated in, for example, FIG. 3.

The first wiring 9 may be electrically connected to at least one of the pixels 7 in the first display device 1. The first wiring 9 being a single set of wiring may be connected in parallel to two or more pixels 7 in the first display device 1. In this case, the pixels 7 may be arranged in the row direction or in the column direction. Each of the multiple sets of the first wiring 9 may be connected in parallel to two or more pixels 7 arranged in multiple rows. Each of the multiple sets of the first wiring 9 may be connected in parallel to two or more pixels 7 arranged in multiple columns. The first wiring 9 may provide a power supply voltage or an emission control signal to at least one of the pixels 7 in the first display device 1. For the light emitter 71 being a µLED, the power supply voltage may be a first power supply voltage VDD of, for example, about 10 to 15 V or a second power supply voltage VSS of, for example, about 0 to 3 V.

The second display device 2 may include a second wiring 10 on the second display surface 3a2. The second wiring 10 may be located at the edge adjacent to the second side surface 3d2 as illustrated in, for example, FIGS. 1 and 2. The second wiring 10 may be located in the insulating substrate 8 or on the insulating substrate 8. The second wiring 10 may be a single set of wiring located in the insulating substrate 8, or may include multiple sets of wiring each located between different layers of the multiple insulating layers 81, 82, and 83.

The second wiring 10 may be electrically connected to at least one of the pixels 7 in the second display device 2. The second wiring 10 being a single set of wiring may be connected in parallel to two or more pixels 7 in the second display device 2. In this case, the pixels 7 may be arranged in the row direction or in the column direction. Each of the multiple sets of the second wiring 10 may be connected in parallel to two or more pixels 7 arranged in the multiple rows. Each of the multiple sets of the second wiring 10 may be connected in parallel to two or more pixels 7 arranged in the multiple columns. The second wiring 10 may provide a power supply voltage (the first power supply voltage VDD or the second power supply voltage VSS) or an emission control signal to at least one of the pixels 7 in the second display device 2.

Each of the first wiring 9 and the second wiring 10 may include, for example, layers of Mo/Al/Mo or MoNd/AlNd/MoNd. Mo/Al/Mo indicates a structure including a Mo layer, an Al layer, and a Mo layer stacked in this order. The same applies to other notations.

The first wiring 9 may include a wiring pad 9b at an end 9a adjacent to the first side surface 3c1. The second wiring 10 may include a wiring pad 10b at an end 10a adjacent to the second side surface 3d2. The wiring pads 9b and 10b may be made of a transparent conductor such as ITO or IZO.

The first side wiring 5 extends from the first side surface 3c1 to the first display surface 3a1. The second side wiring 6 extends from the second side surface 3d2 to the second display surface 3a2. The first side wiring 5 in the first display device 1 may be hereafter referred to as a first side wiring 51. The second side wiring 6 in the second display device 2 may be hereafter referred to as a second side wiring 62.

As illustrated in, for example, FIG. 3, the first side wiring 51 may be connected to the wiring pad 9b and electrically connected to the first wiring 9. As illustrated in, for example, FIG. 3, the first side wiring 51 may extend from the first side surface 3c1 to the first non-display surface 3b1 and be connected to the first drive 15a (illustrated in FIG. 1) on the first non-display surface 3b1 with a back wiring 14 on the first non-display surface 3b1. The first drive 15a may generate a power supply voltage and an emission control signal to be provided to the pixels 7 in the first display device 1. The back wiring 14 may be covered with a protective layer 21 as illustrated in, for example, FIG. 3. The protective layer 21 may be made of, for example, an inorganic insulating material such as silicon oxide ($SiO_2$) or silicon nitride ($Si_3N_4$), or an organic insulating material such as an acrylic resin or an epoxy resin.

The second side wiring 62 may be connected to the wiring pad 10b and electrically connected to the second wiring 10. The second side wiring 62 may extend from the second side surface 3d2 to the second non-display surface 3b2 and be connected to the second drive 15b (illustrated in FIG. 1) on the second non-display surface 3b2 with the back wiring 14 on the second non-display surface 3b2. The second drive 15b may generate a power supply voltage and an emission control signal to be provided to the pixels 7 in the second display device 2.

The first side wiring 5 may include a conductive paste containing conductive particles of, for example, Ag, Cu, Al, or stainless steel, an uncured resin component, an alcohol solvent, and water. The conductive paste may be applied to an intended portion from the side surface 3c of the substrate 3 to the display surface 3a and to the non-display surface 3b and cured by heating, photocuring using ultraviolet ray irradiation, or a combination of photocuring and heating. The first side wiring 5 may also be formed with a thin film deposition method, such as plating, vapor deposition, or CVD. The side surfaces 3c may include grooves preformed for the first side wiring 5. This allows the conductive paste for the first side wiring 5 to be easily received in the intended portions on the side surfaces 3c. The second side wiring 6 are formed with the same method as the first side wiring 5, and thus the method will not be described.

As illustrated in FIG. 2, the first side wiring 51 may have a height (thickness) h1 from the first side surface 3c1 of, for example, about 5 to 50 µm, about 10 to 30 µm, or about 15 to 20 µm as viewed in plan. The second side wiring 62 may have a height (thickness) h2 from the second side surface 3d2 of, for example, about 5 to 50 μm, about 10 to 30 μm, or about 15 to 20 μm as viewed in plan. For the first side wiring 51 and the second side wiring 62 with an overcoat layer such as a protective layer on their surfaces, the height h1 of the first side wiring 51 and the height h2 of the second side wiring 62 may include the thickness of the overcoat layer.

The first side wiring 5 and the second side wiring 6 may each be a stack of multiple layers. The first side wiring 5 and the second side wiring 6 can thus have a greater thickness to have lower resistance. This structure also facilitates adjustment of the resistance of the first side wiring 5 and the resistance of the second side wiring 6 to intended values. For the first side wiring 5 and the second side wiring 6 made of a conductive paste being applied and fired, the process of applying and firing the conductive paste may be performed multiple times. For the first side wiring 5 and the second side wiring 6 formed with a thin-film formation method, the formation process may be performed multiple times as well. The first side wiring 5 and the second side wiring 6 being stacks of multiple layers may include upper layers thinner than their lower layers. This structure further facilitates adjustment of the resistance of the first side wiring 5 and the resistance of the second side wiring 6 to intended values. For example, for the first side wiring 5 and the second side wiring 6 each with two layers, the second layer (upper layer) may be thinner than the first layer (lower layer). The second layer may have a thickness greater than or equal to 0.1 times and less than one time the thickness of the first layer, but the thickness is not limited to this range.

As illustrated in, for example, FIGS. 1 and 2, in the multi-display 200, the first side surface 3c1 of the first display device 1 and the second side surface 3d2 of the second display device 2 are adjacent to and face each other. The first side surface 3c1 and the second side surface 3d2 may be parallel to each other. A distance d between the first side surface 3c1 and the second side surface 3d2 may be greater than or equal to the height h1 of the first side wiring 51 and greater than or equal to the height h2 of the second side wiring 62. The distance d may be less than or equal to about 100 μm or less than or equal to about 50 μm. The distance d may be less than or equal to about 2×h1 or less than or equal to 2×h2.

In the multi-display 200, the first side wiring 51 in the first display device 1 and the second side wiring 62 in the second display device 2 are located without facing each other. In other words, the first side wiring 51 and the second side wiring 62 do not overlap each other when viewed in the direction orthogonal to the first side surface 3c1. This structure allows the first display device 1 and the second display device 2 to be located adjacent to each other with less likelihood of short-circuiting between the first side wiring 51 and the second side wiring 62. This reduces variations in the pixel pitch of the multi-display 200 at the joint between the first display device 1 and the second display device 2 when the pixel pitch of the display devices D is relatively small, thus improving the display quality of the multi-display 200.

The pixel pitch may be, for example, about 40 to 400 μm, about 40 to 120 μm, about 60 to 100 μm, or about 80 μm.

The multi-display 200 includes the first side wiring 51 and the second side wiring 62 located without facing each other. This reduces the likelihood that the first side wiring 51 and the second side wiring 62 hit each other under, for example, any vibration or thermal expansion during use of the multi-display 200. This reduces the likelihood that the first side wiring 51 and the second side wiring 62 break or come off, thus improving the operational reliability and the long-term reliability of the multi-display 200.

The first side wiring 51 and the second side wiring 62 may be apart from each other by an interval (interval g) in the direction along the first side surface 3c1 (the second side surface 3d2) as viewed in plan. This reliably reduces the likelihood that the first side wiring 51 and the second side wiring 62 come into contact with or hit each other. The interval g may be greater than or equal to the width (width w) of the first side wiring 51 or the second side wiring 62 in the direction along the first side surface 3c1 (the second side surface 3d2). This more reliably reduces the likelihood that the first side wiring 51 and the second side wiring 62 come into contact with or hit each other. The interval g may be, but not limited to, about one to ten times inclusive the width w.

As illustrated in, for example, FIG. 1, in the multi-display 200, the first display device 1 may include multiple sets of the first side wiring 51, and the second display device 2 may include multiple sets of the second side wiring 62. In this case, the multiple sets of the first side wiring 51 and the multiple sets of the second side wiring 62 are located without facing each other. This improves the display quality of the multi-display 200, and also improves the operational reliability and the long-term reliability of the multi-display 200. Two sets of the first side wiring 51 adjacent to each other may be apart from each other by a distance greater than or equal to about twice the pixel pitch of the first display device 1. Two sets of the second side wiring 62 adjacent to each other may be apart from each other by a distance greater than or equal to about twice the pixel pitch of the second display device 2. This structure facilitates routing of wires in peripheral portions of the first substrate 31 and the second substrate 32.

As illustrated in, for example, FIG. 2, the first side wiring 51 may be out of contact with the second side surface 3d2, and the second side wiring 62 may be out of contact with the first side surface 3c1. In other words, the distance d between the first side surface 3c1 and the second side surface 3d2 may be greater than the height h1 of the first side wiring 51 and greater than the height h2 of the second side wiring 62. This structure reduces the likelihood that the first side wiring 51 hit the second side surface 3d2 or the second side wiring 62 hit the first side surface 3c1 during use of the multi-display 200. This reduces the likelihood that the first side wiring 51 and the second side wiring 62 break or come off, thus improving the operational reliability and the long-term reliability of the multi-display 200.

Figure 4:
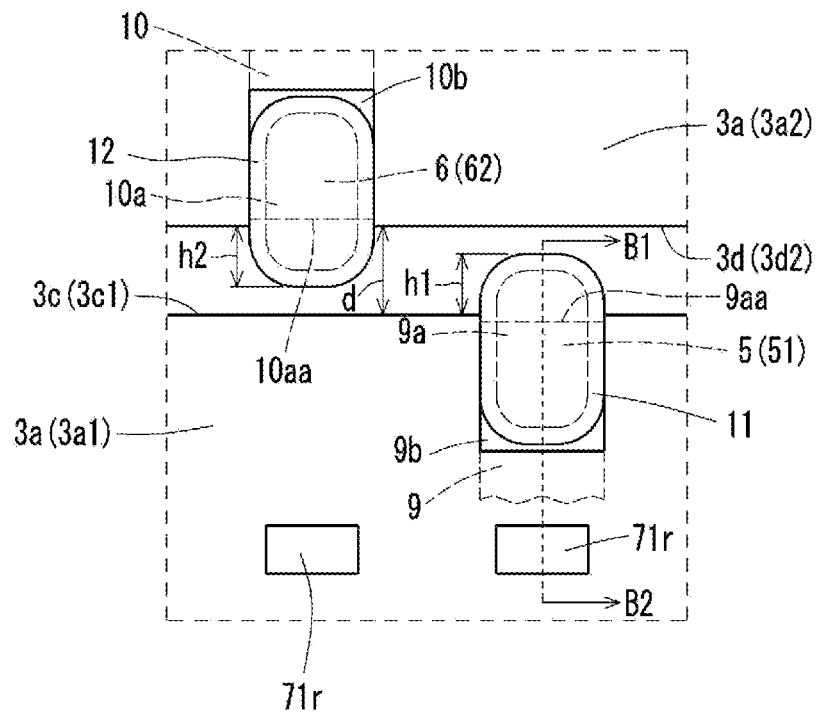
FIG. 4 is a plan view of a variation of the multi-display in FIG. 1, illustrating its main part in an enlarged manner.
Figure 5:
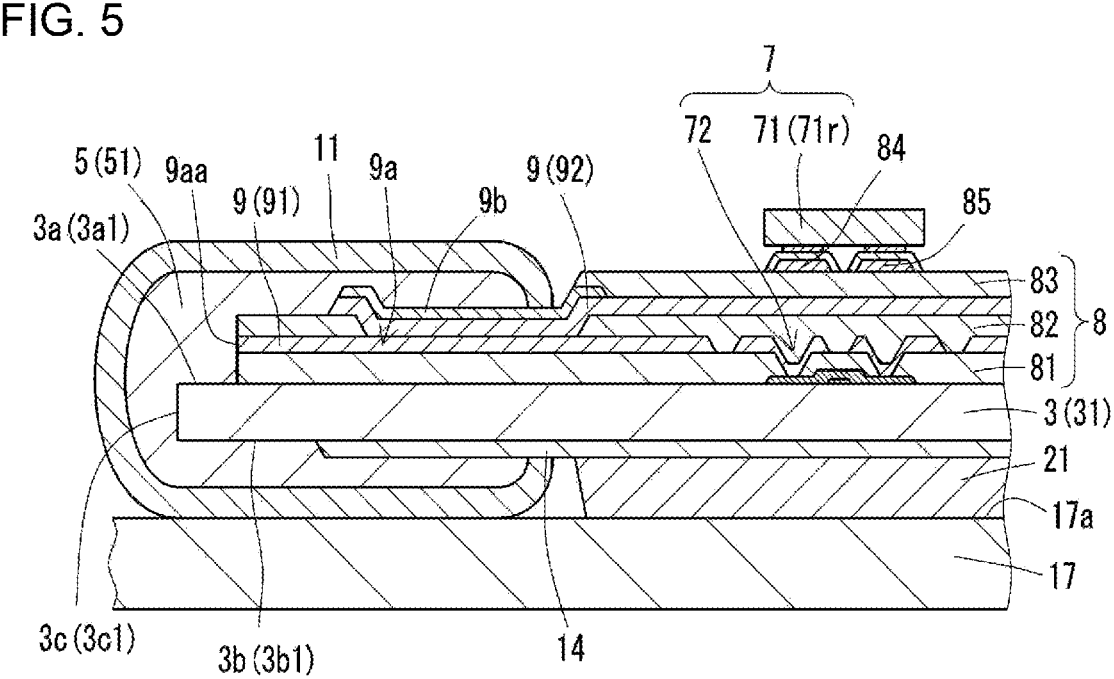
FIG. 5 is a cross-sectional view taken along line B1-B2 in FIG. 4.

As illustrated in, for example, FIGS. 4 and 5, the multi-display 200 may include a first protective layer 11 covering the first side wiring 51 and a second protective layer 12 covering the second side wiring 62. This further reduces the likelihood that the first side wiring 51 and the second side wiring 62 break or come off, thus further improving the operational reliability and the long-term reliability of the multi-display 200.

The first protective layer 11 may extend from the first side surface 3c1 to the first display surface 3a1. As illustrated in, for example, FIG. 4, the portion of the first protective layer 11 located on the first display surface 3a1 may not extend beyond the wiring pad 9b toward the middle of the first display surface 3a1. This structure reduces the likelihood that the first protective layer 11 interferes with the light emitter 71 (light emitters 71r in FIG. 4) being mounted, thus allowing the light emitter 71 to be mounted efficiently.

The second protective layer 12 may extend from the second side surface 3d2 to the second display surface 3a2.

As illustrated in, for example, FIG. 4, the portion of the second protective layer 12 located on the second display surface 3a2 may not extend beyond the wiring pad 10b toward the middle of the second display surface 3a2. This structure reduces the likelihood that the second protective layer 12 interferes with the light emitter 71 being mounted, thus allowing the light emitter 71 to be mounted efficiently.

The first protective layer 11 and the second protective layer 12 may be made of an insulating material. The first protective layer 11 and the second protective layer 12 may be made of an inorganic insulating material or an organic insulating material. Examples of the inorganic insulating material used for the first protective layer 11 and the second protective layer 12 include silicon oxide ($SiO_2$) and silicon nitride ($Si_3N_4$). Examples of the organic insulating material used for the first protective layer 11 and the second protective layer 12 include an acrylic resin, an epoxy resin, and a polycarbonate resin.

As illustrated in, for example, FIG. 4, the first protective layer 11 may be out of contact with the second side surface 3d2, and the second protective layer 12 may be out of contact with the first side surface 3c1. This reduces the likelihood that the first side wiring 51 covered with the first protective layer 11 hits the second side surface 3d2 or the second side wiring 62 covered with the second protective layer 12 hits the first side surface 3c1 under, for example, any vibration or thermal expansion during use of the multi-display 200. The first side wiring 51 is protected with the first protective layer 11. This effectively reduces, for example, breakage of the first side wiring 51 when the first side wiring 51 comes into contact with or hits the second side surface 3d2. The same applies to the second side wiring 62. This further reduces the likelihood that the first side wiring 5 and the second side wiring 6 break, thus further improving the operational reliability and the long-term reliability of the multi-display 200.

Figure 6:
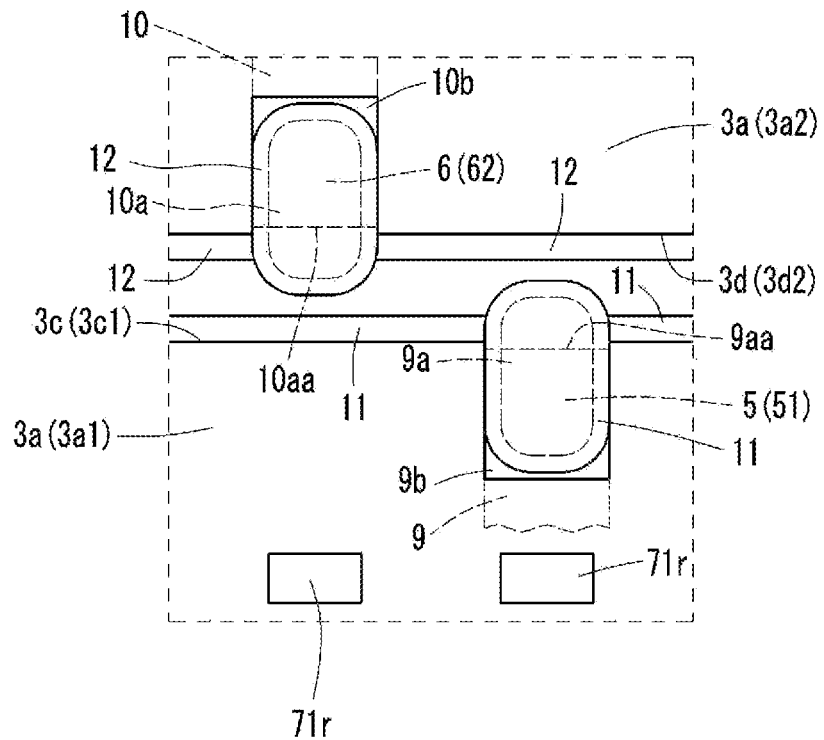
FIG. 6 is a plan view of a variation of the multi-display in FIG. 1, illustrating its main part in an enlarged manner.

As illustrated in for example, FIG. 6, the portion of the first protective layer 11 on the first side surface 3c1 may cover the first side surface 3c1 in addition to the first side wiring 51. In a structure with multiple sets of the first side wiring 51, for example, this reduces the likelihood of short-circuiting between the multiple sets of the first side wiring 51 and other wiring in the multi-display 200, thus improving the operability of the multi-display 200. The portion of the first protective layer 11 on the first side surface 3c1 may cover a part or a full portion of the first side surface 3c1. In the structure with multiple sets of the first side wiring 51, the first protective layer 11 may also cover at least a part of the first side surface 3c1 over the multiple sets of the first side wiring 51.

As illustrated, for example, in FIG. 6, the portion of the second protective layer 12 on the second side surface 3d2 may cover the second side surface 3d2 in addition to the second side wiring 62. In a structure with multiple sets of the second side wiring 62, for example, this reduces the likelihood of short-circuiting between the multiple sets of the second side wiring 62 and other wiring in the multi-display 200, thus improving the operability of the multi-display 200. The portion of the second protective layer 12 on the second side surface 3d2 may cover a part or a full portion of the second side surface 3d2. In the structure with multiple sets of the second side wiring 62, the second protective layer 12 may also cover at least a part of the second side surface 3d2 over the multiple sets of the second side wiring 62.

As illustrated in, for example, FIGS. 2 to 5, the first side wiring 51 and the second side wiring 62 may each include an outer surface curved outward. With the outer surfaces of the first side wiring 51 and the second side wiring 62 rounded to eliminate sharp corners, the first side wiring 51 and the second side wiring 62 are less likely to be, for example, caught by other components of the multi-display 200 and break under any vibration and thermal expansion during use of the multi-display 200. This improves the operational reliability and the long-term reliability of the multi-display 200. This also further reduces the likelihood that the first side wiring 51 and the second side wiring 62 come into contact with each other. Thus, the first side wiring 51 and the second side wiring 62 can be located closer to each other.

Figure 7:
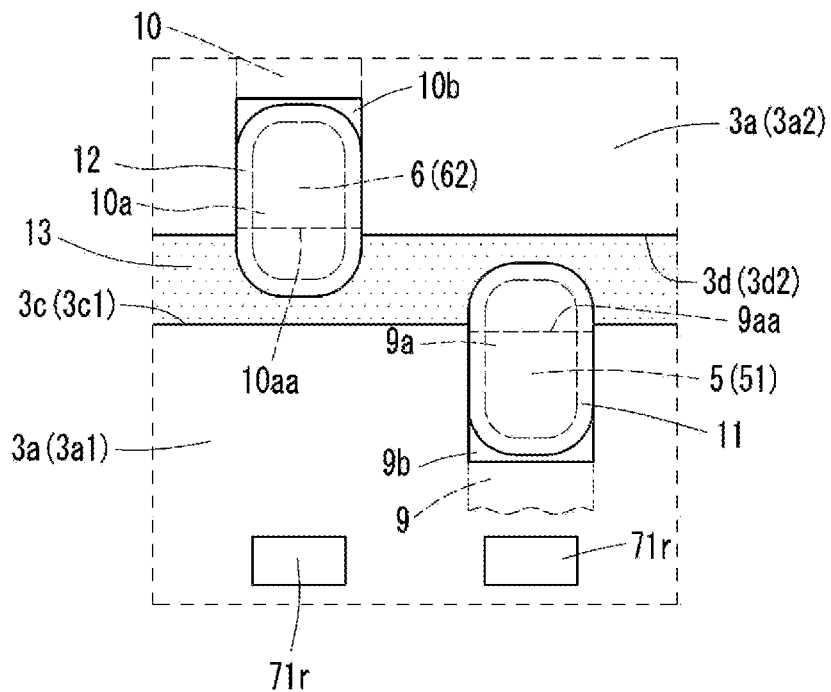
FIG. 7 is a plan view of a variation of the multi-display in FIG. 1, illustrating its main part in an enlarged manner.

In the multi-display 200, the first side surface 3c1 and the second side surface 3d2 may be bonded with a bond 13 as illustrated in, for example, FIG. 7. The bond 13 may be an adhesive such as an epoxy resin adhesive or an acrylic resin adhesive.

The bond 13 may be light-shielding. This allows the joint between the first display device 1 and the second display device 2 to be less noticeable to a viewer, thus improving the display quality of the multi-display 200.

The bond 13 may not be light-shielding. In this case, light-shielding tape may be attached to the front surface of the bond 13, or an insulating resin layer with light-shielding property may be located on the front surface of the bond 13. This allows the joint between the first display device 1 and the second display device 2 to be less noticeable to the viewer.

The bond 13 may bond the entire first side surface 3c1 and the entire second side surface 3d2. The bond 13 may bond a part of the first side surface 3c1 and a part of the second side surface 3d2. In this case, the bond 13 can substantially follow displacement of the first substrate 31 and the second substrate 32 under, for example, any vibration or thermal expansion. This reduces excess stress applied to the joint between the first substrate 31 and the second substrate 32, thus reducing the likelihood that the joint breaks. The bond 13 may join 10 to 90% inclusive of the entire area of each of the first side surface 3c1 and the second side surface 3d2, but the proportion is not limited to this range.

The first display device 1 and the second display device 2 may be mechanically joined together with, for example, screws, rather than being bonded with an adhesive. In this case, the relative positions of the first display device 1 and the second display device 2 can be adjusted after the first display device 1 and the second display device 2 are joined. For example, the first display device 1 and the second display device 2 may be each fitted into frames, which may be mechanically joined using, for example, screws, a fitting member, or an engagement member.

The multiple pixels 7 in the first display device 1 and the multiple pixels 7 in the second display device 2 may be in a matrix as viewed in plan. As illustrated in, for example, FIG. 8, the first side wiring 51 may be at least partially located between, as viewed in plan, pixels (also referred to as outermost pixels) 7p located at the outermost rows and columns of the matrix and adjacent to the first side surface 3c1. The second side wiring 62 may also be at least partially located between, as viewed in plan, pixels 7p of pixels 7p located at the outermost rows and columns of the matrix and adjacent to the second side surface 3d2.

Figure 8:
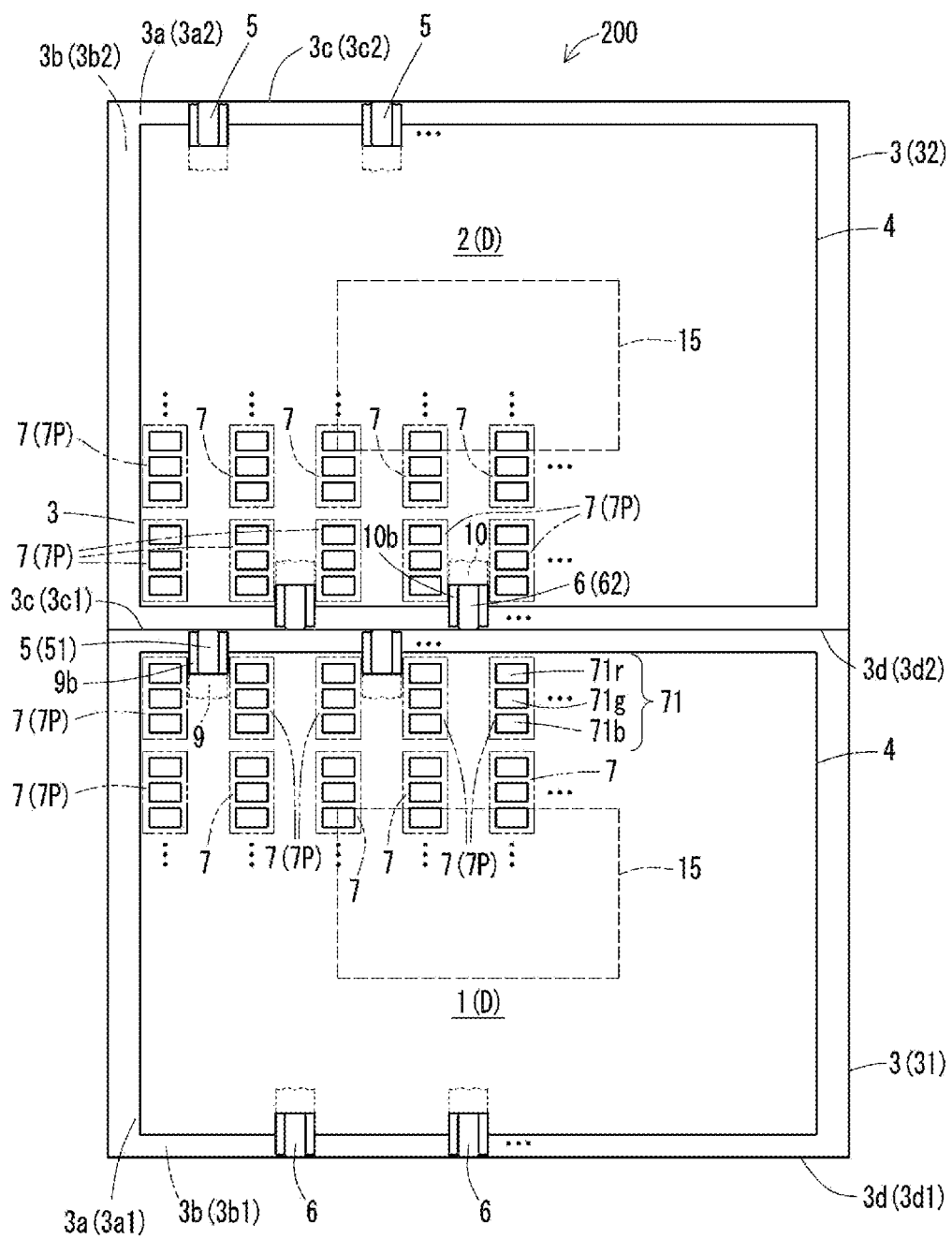
FIG. 8 is a plan view of a multi-display according to another embodiment of the present disclosure.

The multi-display 200 in FIG. 8 can reduce the area of the peripheral portion (also referred to as a frame portion) of the display portion 4 in each display device D. This reduces variations in the pixel pitch of the multi-display 200 at the joint between the first display device 1 and the second display device 2 when the pixel pitch of the display devices D is small, thus improving the display quality of the multi-display 200.

The multi-display 200 in FIG. 8 reduces a decrease in the area of connection between the first side wiring 51 and the wiring pad 9b and the decrease in the area of connection between the second side wiring 62 and the wiring pad 10b when the pixel pitch of the display devices D is small. This structure can reduce any increase in connection resistance (contact resistance) between the first side wiring 51 and the wiring pad 9b and also reliably fix the first side wiring 51 to the wiring pad 9b. This structure can also reduce any increase in connection resistance (contact resistance) between the second side wiring 62 and the wiring pad 10b and also reliably fix the second side wiring 62 to the wiring pad 10b. This improves the operational reliability and the long-term reliability of the multi-display 200.

Figure 9:
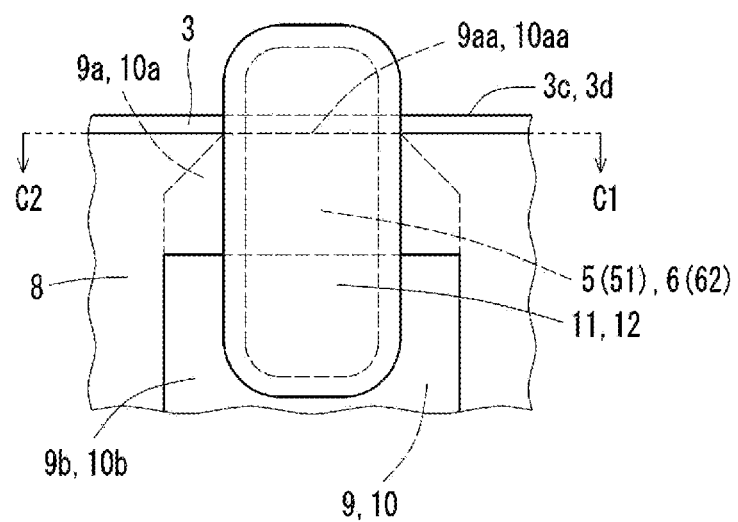
FIG. 9 is a plan view of the multi-display in FIG. 8, illustrating its main part in an enlarged manner.

As illustrated in, for example, FIG. 9, the first wiring 9 may include an end face 9aa adjacent to the first side surface 3c1 inward from (in other words, nearer the middle of the first display surface 3a1 than) the first side surface 3c1 as viewed in plan. Similarly to the first wiring 9, the second wiring 10 may include an end face 10aa adjacent to the second side surface 3d2 inward from (in other words, nearer the middle of the second display surface 3a2 than) the second side surface 3d2 as viewed in plan. This improves the manufacturing yields of the first display device 1 and the second display device 2 as described later.

Figure 10:
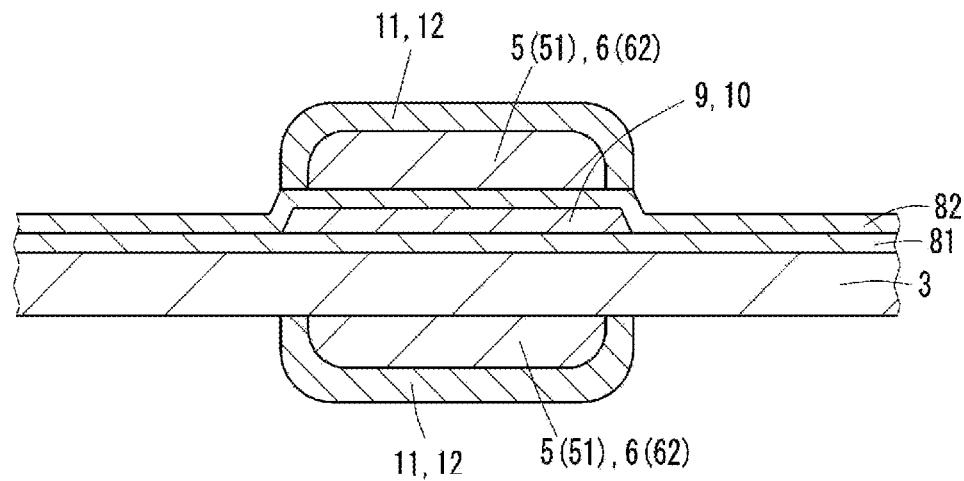
FIG. 10 is a cross-sectional view taken along line C1-C2 in FIG. 9.
Figure 11:
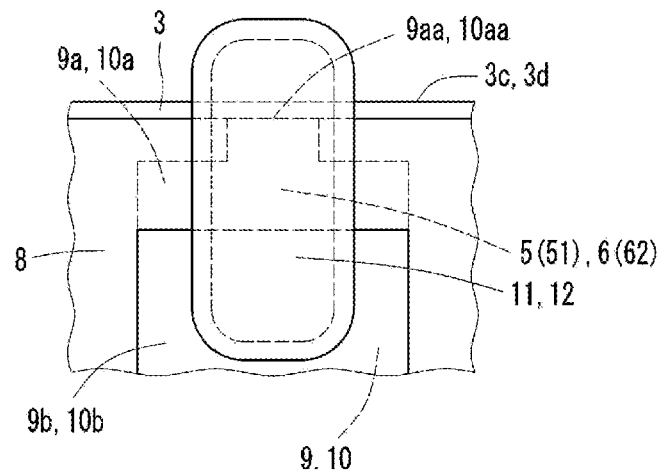
FIG. 11 is a plan view of a variation of the multi-display in FIG. 8, illustrating its main part in an enlarged manner.

The end face 9aa of the first wiring 9 may be covered with at least one of the first side wiring 51 or the first protective layer 11 as illustrated in, for example, FIGS. 9 and 10, or may be covered with the first side wiring 51 as illustrated in, for example, FIG. 11. This structure can reduce deterioration in the quality of the first wiring 9 caused by, for example, corrosion, thus improving the operational reliability and the long-term reliability of the multi-display 200. The end face 9aa of the first wiring 9 may be covered with the first side wiring 51 and the first protective layer 11 covering the first side wiring 51. This structure can further reduce deterioration in the quality of the first wiring 9.

The end face 10aa of the second wiring 10 may be covered with at least one of the second side wiring 62 or the second protective layer 12 as illustrated in, for example, FIGS. 9 and 10, or may be covered with the second side wiring 62 as illustrated in, for example, FIG. 11. This structure can reduce deterioration in the quality of the second wiring 10 caused by, for example, corrosion, thus improving the operational reliability and the long-term reliability of the multi-display 200. The end face 10aa of the second wiring 10 may be covered with the second side wiring 62 and the second protective layer 12 covering the second side wiring 62. This structure can further reduce deterioration in the quality of the second wiring 10.

As illustrated in, for example, FIGS. 9 and 11, the first wiring 9 may include the end 9a adjacent to the first side surface 3c1 tapering toward the first side surface 3c1. When the pixel pitch of the first display device 1 is small, this structure can reduce a decrease in the area of connection between the first side wiring 51 and the wiring pad 9b, and also allows the end face 9aa of the first wiring 9 to be easily covered with at least one of the first side wiring 51 or the first protective layer 11. This structure can reduce any increase in connection resistance (contact resistance) between the first side wiring 51 and the wiring pad 9b and also reliably fix the first side wiring 51 to the wiring pad 9b. This structure can reduce deterioration in the quality of the first wiring 9 caused by, for example, corrosion. This improves the operational reliability and the long-term reliability of the multi-display 200.

As illustrated in, for example, FIGS. 9 and 11, the second wiring 10 may include the end 10a adjacent to the second side surface 3d2 tapering toward the second side surface 3d2. When the pixel pitch of the second display device 2 is small, this structure can reduce a decrease in the area of connection between the second side wiring 62 and the wiring pad 10b, and also allows the end face 10aa of the second wiring 10 to be covered with at least one of the second side wiring 62 or the second protective layer 12. This structure can reduce any increase in connection resistance (contact resistance) between the second side wiring 62 and the wiring pad 10b and also reliably fix the second side wiring 62 to the wiring pad 10b. This structure can reduce deterioration in the quality of the second wiring 10 caused by, for example, corrosion. This improves the operational reliability and the long-term reliability of the multi-display 200.

Each of the first display device 1 and the second display device 2 includes the drive 15 on the non-display surface 3b of the substrate 3. The drive 15 may be connected to an external power supply (not illustrated) and may generate the first power supply voltage VDD and the second power supply voltage VSS based on power supplied from the external power supply. The drive 15 may be connected to an external circuit (not illustrated) and may generate control signals CS such as emission control signals and scanning signals based on, for example, image signals input from the external circuit.

Each drive 15 may be, for example, a drive element, such as an IC or an LSI circuit, mounted on the non-display surface 3b of the substrate 3 by, for example, chip on glass (COG). The drive 15 may also be a thin-film circuit with a TFT including a semiconductor layer made of LTPS formed by thin film deposition such as CVD on the non-display surface 3b of the substrate 3. The drive 15 may also be a drive element on a flexible wiring board connected to an external connection terminal located on the non-display surface 3b of the substrate 3. The drive 15 may also be an external drive element electrically connected to a wiring on the flexible wiring board.

The first drive 15a in the first display device 1 may be electrically connected to at least one of the pixels 7 in the first display device 1 with the back wiring 14 (illustrated in FIGS. 3 and 5) and the first side wiring 51. The first drive 15a may supply the first power supply voltage VDD, the second power supply voltage VSS, or the control signal CS to at least one of the pixels 7 in the first display device 1 through the first side wiring 51.

The second drive 15b in the second display device 2 may be electrically connected to at least one of the pixels 7 in the second display device 2 with the back wiring 14 and the second side wiring 62. The second drive 15b may supply the first power supply voltage VDD, the second power supply voltage VSS, or the control signal CS to the display portion 4 in the second display device 2 through the second side wiring 62.

The drive 15 in each display device D and at least one pixel 7 in the display device D may be electrically connected to each other with a feedthrough conductor such as a through-hole extending through the substrate 3 from the display surface 3a to the non-display surface 3b. The drive 15 and at least one pixel 7 electrically connected to each other with the first side wiring 51 or the second side wiring 62 can reduce the area of the frame portion in the display device D.

The first side wiring 51 and the second side wiring 62 may be electrically connectable to each other. This structure allows the first display device 1 and the second display device 2 to transmit and receive signals to and from each other through the first side wiring 51 and the second side wiring 62. The first side wiring 51 and the second side wiring 62 may be electrically connected to each other with, for example, a side connection wiring and a side connection pad connected to the side connection wiring on at least one of the first side surface 3c1 of the first substrate 31 or the second side surface 3d2 of the second substrate 32. The first side wiring 51 and the second side wiring 62 may be electrically connected to each other with, for example, a non-display surface connection wiring on at least one of the first non-display surface 3b1 of the first substrate 31 or the second non-display surface 3b2 of the second substrate 32, the side connection wiring, and the side connection pad. The first side wiring 51 and the second side wiring 62 may be electrically connected to each other with, for example, a display surface connection wiring on at least one of the first display surface 3a1 of the first substrate 31 or the second display surface 3a2 of the second substrate 32, the side connection wiring, and the side connection pad. The first side wiring 51 and the second side wiring 62 may be electrically connected to each other with, for example, connection wires, connection cables, or connectors.

Figure 12:
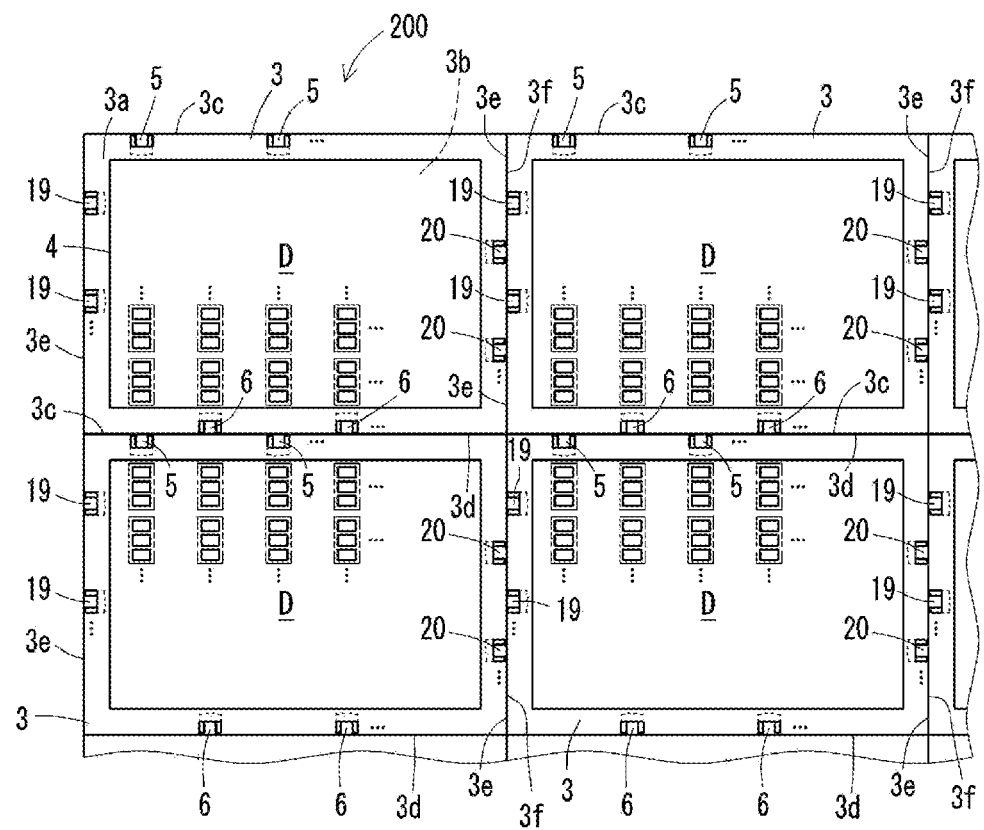
FIG. 12 is a plan view of a multi-display according to another embodiment of the present disclosure.

Although the multi-display 200 includes two display devices D in the embodiment described above, the multi-display 200 may include three or more display devices D as illustrated in, for example, FIG. 12. In this case, two display devices D adjacent to each other may have the same or similar structures as the first display device 1 and the second display device 2 in the multi-display 200 described above. The multi-display 200 including three or more display devices D can thus have higher display quality, higher operational reliability, and higher long-term reliability.

As illustrated in, for example, FIG. 12, each display device D may include a side wiring 19 extending from a side surface 3e to the corresponding display surface 3a and a side wiring 20 extending from a side surface 3f to the display surface 3a. The side surface 3e is a side surface of the rectangular substrate 3 other than the side surface 3c and the opposite side surface 3d. The side surface 4f is a side surface opposite to the side surface 3e. For the multi-display 200 including three or more display devices D arranged vertically and horizontally, a first display device D and a second display device D adjacent to the first display device D may be located with the side surface 3e of the first display device D and the side surface 3f of the second display device D adjacent to and facing each other. The side wiring 19 in the first display device D and the side wiring 20 in the second display device D may be located without facing each other.

Figure 13:
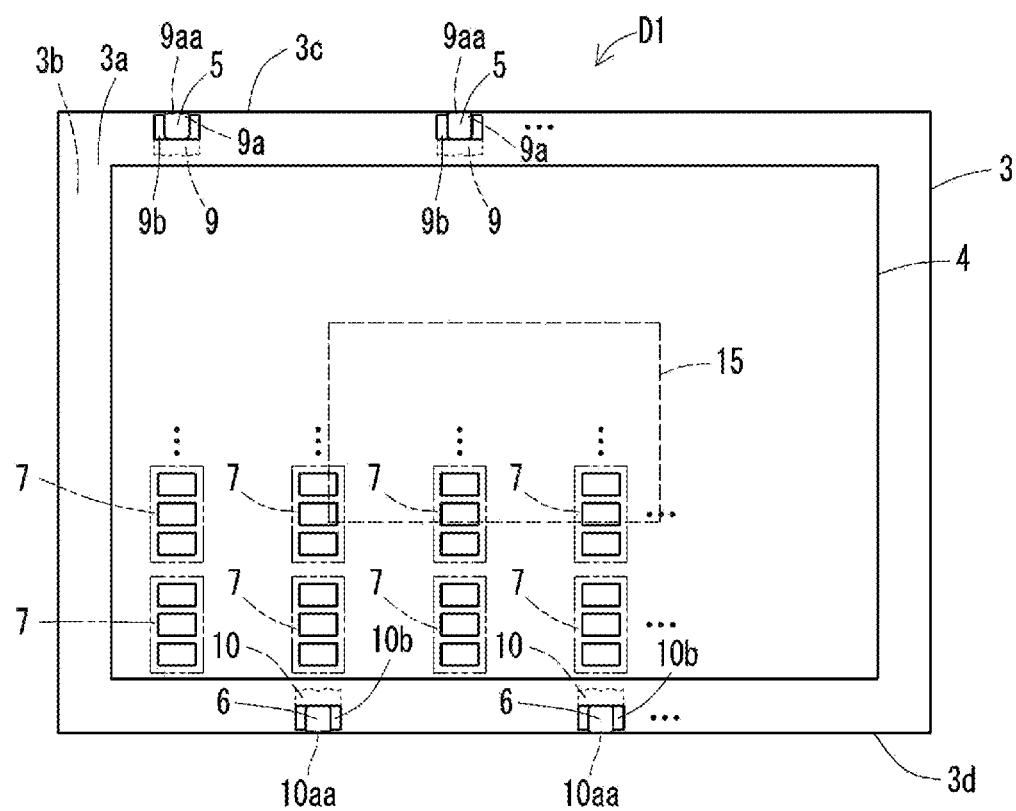
FIG. 13 is a plan view of a display device according to one embodiment of the present disclosure.
Figure 14:
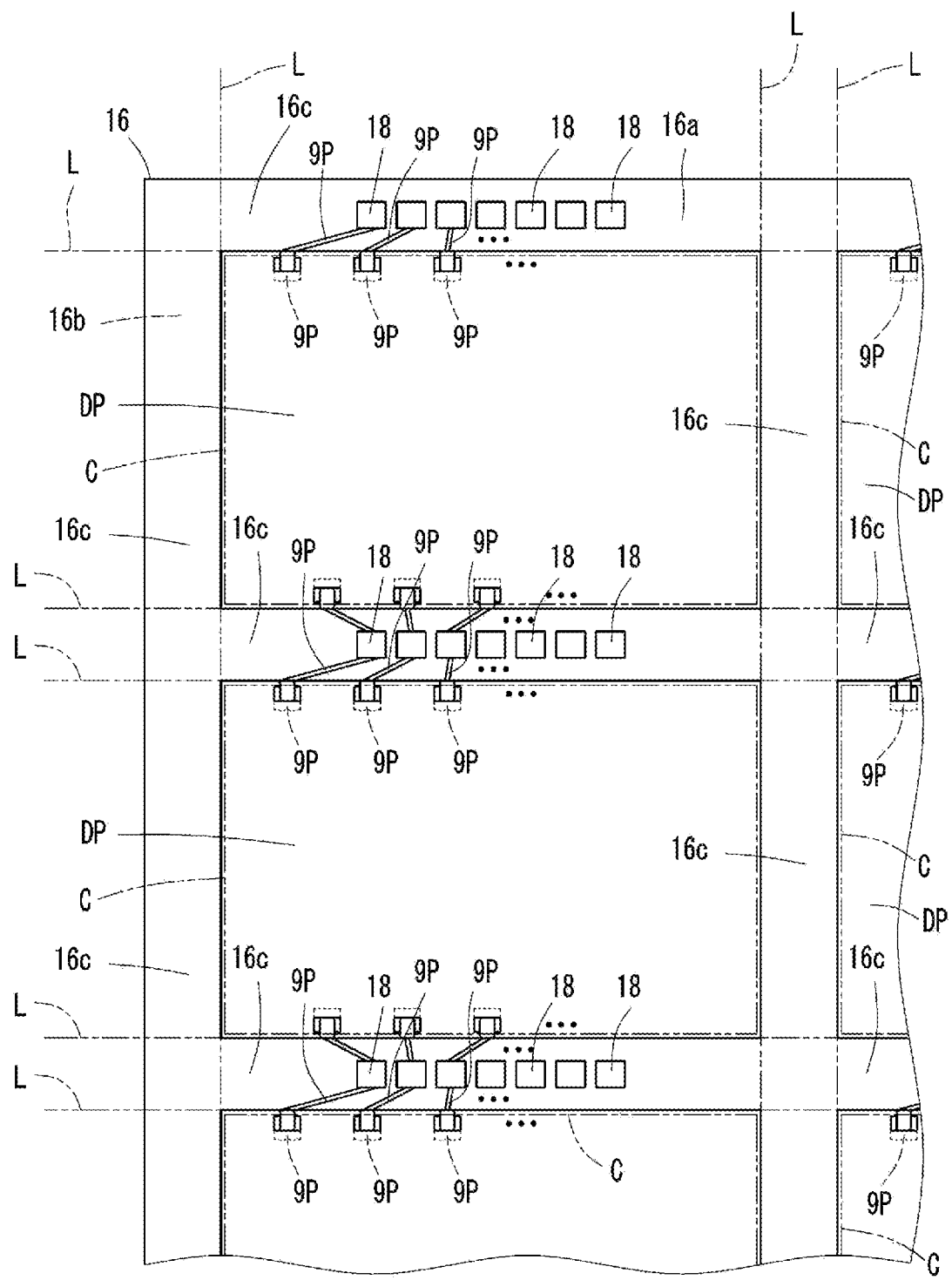
FIG. 14 is a plan view of a mother substrate for manufacturing the display device in FIG. 13.

A display device according to one embodiment of the present disclosure will now be described. FIG. 13 is a plan view of the display device according to one embodiment of the present disclosure. FIG. 14 is a plan view of a mother substrate for manufacturing the display device in FIG. 13. FIGS. 13 and 14 do not illustrate the insulating substrate on the first surface of the substrate.

In the present embodiment, a display device D1 is included in the multi-display 200. The display device D1 has the same or similar structure as the display device D described above. The same reference numerals denote the same or similar components as those in the display device D, and such components will not be described in detail.

The display device D1 includes a substrate 3, a display portion 4, a first side wiring 5, and a second side wiring (hereafter also referred to as an opposite side wiring) 6. In other words, the opposite side wiring 6 is facing a side wiring facing the first side wiring 5 on the substrate 3.

The first side wiring 5 extends from a side surface 3c of the substrate 3 to a display surface 3a. The first side wiring 5 may extend from the side surface 3c to a non-display surface 3b. The opposite side wiring 6 extends from an opposite side surface 3d to the display surface 3a. The opposite side wiring 6 may extend from the opposite side surface 3d to the non-display surface 3b.

In the display device D1, the first side wiring 5 and the opposite side wiring 6 are located without facing each other. In other words, the first side wiring 5 and the opposite side wiring 6 do not overlap each other when viewed in the direction orthogonal to the side surface 3c. Thus, multiple display devices D1 including a first display device D1a (not illustrated) and a second display device D1b (not illustrated) can be arranged to be the multi-display 200 with the side surface 3c of the first display device D1a and the opposite side surface 3d of the second display device D1b adjacent to and facing each other and with the first side wiring 5 in the first display device D1a and the opposite side wiring 6 in the second display device D1b not facing each other.

The display device D1 may include a first wiring (hereafter also simply referred to as a wiring) 9 on the display surface 3a. The first wiring 9 may have the same or similar structure as the first wiring 9 illustrated in FIGS. 9 to 11. The multi-display 200 can thus have higher display quality, higher operational reliability, and higher long-term reliability when the pixel pitch of the display devices D1 is small.

The display device D1 may include a second wiring 10 on the display surface 3a. The second wiring 10 may have the same or similar structure as the second wiring 10 illustrated in FIGS. 9 to 11. The multi-display 200 can thus have higher display quality, higher operational reliability, and higher long-term reliability when the pixel pitch of the display devices D1 is small.

The first side wiring 5 and the opposite side wiring 6 may be electrically connectable to each other. This structure allows the first display device D1a and the second display device D1b to transmit and receive signals to and from each other through the first side wiring 5 and the opposite side wiring 6. The structure with the first side wiring 5 and the opposite side wiring 6 electrically connectable to each other may be the same as or similar to those in the embodiments described above.

A method for manufacturing the display device D1 may include, for example, cutting a mother substrate 16 including multiple display device precursors DP to be the display devices D1 into multiple individual pieces as the display device precursors DP. As illustrated in, for example, FIG. 14, the mother substrate 16 includes one main surface 16a corresponding to the display surface 3a of the substrate 3 and the other main surface 16b corresponding to the non-display surface 3b of the substrate 3. Each display device precursor DP on one main surface 16a of the mother substrate 16 includes the precursor of the display portion 4 (hereafter also referred to as a display portion precursor) excluding light emitters 71 and the precursor of the first wiring 9. The mother substrate 16 includes a cutting margin 16c surrounding the display device precursors DP, and the boundaries between the display device precursors DP and the cutting margin 16c defined by cutting lines L.

In the mother substrate 16 yet to be cut, wiring precursors 9P to be the first wiring 9 may extend from inside the display device precursors DP to outside the display device precursors DP (into the cutting margin 16c). The wiring precursors 9P may be connected to inspection pads 18 located outside the display device precursors DP (in the cutting margin 16c). Before the mother substrate 16 is cut, an inspection element such as an inspection probe terminal of an inspection device (not illustrated) may be placed into contact with the inspection pads 18, and an inspection signal may be provided to the inspection pads 18 by the inspection device to inspect the electrical characteristics of the display device precursors DP. The first wiring 9 electrically connects the drive 15 to at least one pixel 7. In other words, the first wiring 9 is used to drive the display device D1. Inspection using the wiring precursors 9P to be the first wiring 9 allows accurate inspection of the display device precursors DP, thus improving the operational reliability of the display devices D1.

The wiring precursors 9P extend from inside the display device precursors DP to outside the display device precursors DP. Thus, the first wiring 9 includes end faces 9aa exposed on the side surfaces (corresponding to the side surfaces 3c) of the display device precursors DP cut into individual pieces. Each end face 9aa may be covered with at least one of the first side wiring 5 or the first protective layer 11 to reduce deterioration in the quality of the first wiring 9 caused by, for example, corrosion. The display device D1 thus has higher operational reliability and long-term reliability, and the multi-display 200 has higher operational reliability and long-term reliability.

The mother substrate 16 may be cut with, for example, a laser beam applied to the other main surface 16b of the mother substrate 16 along the cutting lines L. Of portions of the display portion precursors near the cutting lines L (hereafter also referred to as cutting portions) C, cutting portions C at the outer periphery (peripheral portion) of the mother substrate 16 may be removed before the mother substrate 16 is cut. This reduces the likelihood that the laser beam causes the material of the cutting portions C at the outer periphery (peripheral portion) of the mother substrate 16 to evaporate or scatter and adhere to, for example, electrodes such as the anode electrodes 84 and the cathode electrodes 85 and wiring conductors in the display portion precursors as foreign matter. This improves the manufacturing yield of the display device D1 and the operational reliability of the display device D1. When the mother substrate 16 is cut with, for example, a wheel cutter, the cutting portions C may not be removed in advance.

The mother substrate 16 is cut along the cutting lines L to be the multiple display device precursors DP. The multiple light emitters 71 are mounted on each display device precursor DP, and the back wiring 14, the drive 15, the first side wiring 5, and the opposite side wiring 6 are formed on each display device precursor DP. This completes the multiple display devices D1. The display devices D1 are arranged with the side surface 3c of one display device D1 and the opposite side surface 3d of another display device D1 adjacent to and facing each other to complete the multi-display 200.

The multi-display according to one or more embodiments of the present disclosure may be implemented in forms 1 to 13 described below.

(1) A multi-display, comprising:
a first display device including a first substrate including a first display surface and a first side surface continuous with the first display surface, a first display portion on the first display surface, and a first side wiring extending from the first side surface to the first display surface; and
a second display device including a second substrate including a second display surface and a second side surface continuous with the second display surface, a second display portion on the second display surface, and a second side wiring extending from the second side surface to the second display surface,
wherein the first side surface and the second side surface are adjacent to and face each other, and
the first side wiring and the second side wiring are located without facing each other.

(2) The multi-display according to (1), wherein
the first side wiring is out of contact with the second side surface, and
the second side wiring is out of contact with the first side surface.

(3) The multi-display according to (1) or (2), further comprising:
a first protective layer covering the first side wiring; and
a second protective layer covering the second side wiring.

(4) The multi-display according to (3), wherein
the first protective layer is out of contact with the second side surface, and
the second protective layer is out of contact with the first side surface.

(5) The multi-display according to (3) or (4), wherein
the first protective layer covers the first side surface, and
the second protective layer covers the second side surface.

(6) The multi-display according to any one of (1) to (5), wherein
the first side wiring includes an outer surface curved outward, and
the second side wiring includes an outer surface curved outward.

(7) The multi-display according to any one of (1) to (6), wherein
the first side surface and the second side surface are bonded with a bond.

(8) The multi-display according to (7), wherein
the bond is light-shielding.

(9) The multi-display according to any one of (1) to (8), further comprising:
a base substrate,
wherein the first display device and the second display device are fixed on the base substrate.

(10) The multi-display according to any one of (1) to (9), wherein
the first display portion includes a plurality of pixels in a matrix on the first display surface, the second display portion includes a plurality of pixels in a matrix on the second display surface, and each of the plurality of pixels includes a light emitter and a pixel circuit configured to drive the light emitter,
the first side wiring is at least partially located between pixels adjacent to the first side surface as viewed in plan, and the pixels adjacent to the first side surface are pixels of a plurality of outermost pixels in outermost rows and columns of the matrix, and
the second side wiring is at least partially located between pixels adjacent to the second side surface as viewed in plan, and the pixels adjacent to the second side surface are pixels of a plurality of outermost pixels in outermost rows and columns of the matrix.

(11) The multi-display according to (1) or (2), wherein the first display device includes a first wiring located at an edge of the first display surface adjacent to the first side surface and connected to at least one of a plurality of pixels in the first display portion, the first wiring includes a first end face adjacent to the first side surface located inward from the first side surface, and the first end face is covered with the first side wiring or covered with the first side wiring and a first protective layer covering the first side wiring, and the second display device includes a second wiring located at an edge of the second display surface adjacent to the second side surface and connected to at least one of a plurality of pixels in the second display portion, the second wiring includes a second end face adjacent to the second side surface located inward from the second side surface, and the second end face is covered with the second side wiring or covered with the second side wiring and a second protective layer covering the second side wiring.

(12) The multi-display according to any one of (1) to (11), wherein
the first display device includes a first drive on a first non-display surface opposite to the first display surface, and the second display device includes a second drive on a second non-display surface opposite to the second display surface,
in the first display device, the first drive is electrically connected to at least one of a plurality of pixels in the first display portion with the first side wiring, and
in the second display device, the second drive is electrically connected to at least one of a plurality of pixels in the second display portion with the second side wiring.

(13) The multi-display according to any one of (1) to (12), wherein
the first side wiring and the second side wiring are electrically connectable to each other.

The display device according to one or more embodiments of the present disclosure may be implemented in forms 14 and 15 described below.

(14) A display device, comprising:
a substrate including a display surface, a side surface continuous with the display surface, and an opposite side surface opposite to the side surface;
a display portion on the display surface;
a side wiring extending from the side surface to the display surface; and
an opposite side wiring extending from the opposite side surface to the display surface,
wherein the side wiring and the opposite side wiring are located without facing each other.

(15) The display device according to (14), wherein
The substrate includes a wiring at an edge of the display surface adjacent to the side surface,
the wiring includes an end face adjacent to the side surface located inward from the side surface, and
the end face is covered with the side wiring or covered with the side wiring and a protective layer covering the side wiring.

The multi-display according to one or more embodiments of the present disclosure may be implemented in forms 16 to 19 described below.

(16) A multi-display, comprising:
a plurality of the display devices according to (14) or (15),
wherein the plurality of display devices includes a first display device and a second display device,
the side surface of the first display device and the opposite side surface of the second display device are adjacent to and face each other, and
the side wiring in the first display device and the opposite side wiring in the second display device are located without facing each other.

(17) The multi-display according to (16), wherein
the side wiring and the opposite side wiring are electrically connectable to each other.

(18) The multi-display according to any one of (1) to (13), wherein
the first display portion includes at least one light emitter and the second display portion includes at least one light emitter.

(19) The multi-display according to (16) or (17), wherein
the display portion includes at least one light emitter.

The multi-display according to one or more embodiments of the present disclosure can reduce the likelihood of electrical short-circuiting caused by the side wiring on the joined side surface of a first display device and the side wiring on the joined side surface of a second display device adjacent to the first display device coming into contact with each other. The side wiring on the joined side surface of the display device and the side wiring on the joined side surface of the adjacent second display device are less likely to, for example, come into contact with or hit each other and are less likely to be damaged, break, or come off. The space (joint) between the first display device and the adjacent second display device can be smaller. The multi-display thus has higher operational reliability, higher long-term reliability, and higher display quality. The display device according to one or more embodiments of the present disclosure allows the manufacture of the above multi-display with higher operational reliability, higher long-term reliability, and higher display quality.

Although the embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

INDUSTRIAL APPLICABILITY

The display device and the multi-display according to one or more embodiments of the present disclosure may be used for various electronic devices. Such electronic devices include lighting apparatus, automobile route guidance systems (car navigation systems), ship route guidance systems, aircraft route guidance systems, indicators for instruments in vehicles such as automobiles, instrument panels, smartphones, mobile phones, tablets, personal digital assistants (PDAs), video cameras, digital still cameras, electronic organizers, electronic books, electronic dictionaries, personal computers, copiers, terminals for game devices, television sets, product display tags, price display tags, programmable display devices for industrial use, car audio systems, digital audio players, facsimile machines, printers, automatic teller machines (ATMs), vending machines, medical display devices, digital display watches, smartwatches, guidance display devices installed in stations or airports, and signage (digital signage) for advertisement.

REFERENCE SIGNS 200 multi-display
1 first display device
2 second display device
3 substrate
31 first substrate
32 second substrate
3a display surface of substrate
3a1 first display surface of first substrate
3a2 second display surface of second substrate
3b non-display surface of substrate
3b1 first non-display surface of first substrate
3b2 second non-display surface of second substrate
3c side surface of substrate
3c1 first side surface (joined side surface) of first substrate
3c2 side surface (non-joined side surface) of second substrate
3d opposite side surface of substrate
3d1 first opposite side surface of first substrate
3d2 second side surface (second opposite side surface being joined side surface) of second substrate
3e side surface
3f side surface
4 display portion in display device
4a first display portion in first display device
4b second display portion in second display device
5, 51 first side wiring
6, 62 second side wiring
7 pixel
7p pixel (outermost pixel)
71, 71r, 71g, 71b light emitter
72 pixel circuit
8 insulating substrate
81, 82, 83 insulating layer
84 anode electrode
85 cathode electrode
9, 91, 92 first wiring (wiring)
9P wiring precursor
9a end
9aa end face
9b wiring pad
10 second wiring
10a end portion
10aa end face
10b wiring pad
11 first protective layer
12 second protective layer
13 bond
14 back wiring
15a first drive of first display device
15b second drive of second display device
16 mother substrate
16a one main surface
16b the other main surface
16c cutting margin
17 base substrate
17a one main surface
18 inspection pad
19 side wiring
20 side wiring
21 protective layer
D, D1 display device
DP display device precursor

The invention claimed is:

1. A multi-display, comprising:
a first display device including a first substrate including a first display surface and a first side surface continuous with the first display surface, a first display portion on the first display surface, and a first side wiring extending from the first side surface to the first display surface; and
a second display device including a second substrate including a second display surface and a second side surface continuous with the second display surface, a second display portion on the second display surface, and a second side wiring extending from the second side surface to the second display surface,
wherein the first side surface and the second side surface are adjacent to and face each other, and
the first side wiring and the second side wiring are located without facing each other.

2. The multi-display according to claim 1, wherein the first side wiring is out of contact with the second side surface, and
the second side wiring is out of contact with the first side surface.

3. The multi-display according to claim 1, further comprising:
a first protective layer covering the first side wiring; and
a second protective layer covering the second side wiring.

4. The multi-display according to claim 3, wherein the first protective layer is out of contact with the second side surface, and
the second protective layer is out of contact with the first side surface.

5. The multi-display according to claim 3, wherein the first protective layer covers the first side surface, and the second protective layer covers the second side surface.

6. The multi-display according to claim 1, wherein the first side wiring includes an outer surface curved outward, and
the second side wiring includes an outer surface curved outward.

7. The multi-display according to claim 1, wherein the first side surface and the second side surface are bonded with a bond.

8. The multi-display according to claim 7, wherein the bond is light-shielding.

9. The multi-display according to claim 1, further comprising:
a base substrate,
wherein the first display device and the second display device are fixed on the base substrate.

10. The multi-display according to claim 1, wherein the first display portion includes a plurality of pixels in a matrix on the first display surface, the second display portion includes a plurality of pixels in a matrix on the second display surface, and each of the plurality of pixels includes a light emitter and a pixel circuit configured to drive the light emitter,
the first side wiring is at least partially located between pixels adjacent to the first side surface as viewed in plan, and the pixels adjacent to the first side surface are pixels of a plurality of outermost pixels in outermost rows and columns of the matrix, and
the second side wiring is at least partially located between pixels adjacent to the second side surface as viewed in plan, and the pixels adjacent to the second side surface are pixels of a plurality of outermost pixels in outermost rows and columns of the matrix.

11. The multi-display according to claim 1, wherein the first display device includes first wiring located at an edge of the first display surface adjacent to the first side surface and connected to at least one of a plurality of pixels in the first display portion, the first wiring includes a first end face adjacent to the first side surface located inward from the first side surface, and the first end face is covered with the first side wiring or covered with the first side wiring and a first protective layer covering the first side wiring, and the second display device includes second wiring located at an edge of the second display surface adjacent to the second side surface and connected to at least one of a plurality of pixels in the second display portion, the second wiring includes a second end face adjacent to the second side surface located inward from the second side surface, and the second end face is covered with the second side wiring or covered with the second side wiring and a second protective layer covering the second side wiring.

12. The multi-display according to claim 1, wherein the first display device includes a first drive on a first non-display surface opposite to the first display surface, and the second display device includes a second drive on a second non-display surface opposite to the second display surface, in the first display device, the first drive is electrically connected to at least one of a plurality of pixels in the first display portion with the first side wiring, and in the second display device, the second drive is electrically connected to at least one of a plurality of pixels in the second display portion with the second side wiring.

13. The multi-display according to claim 1, wherein the first side wiring and the second side wiring are electrically connectable to each other.

14. The multi-display according to claim 1, wherein the first display portion includes at least one light emitter and the second display portion includes at least one light emitter.

15. A display device, comprising:

a substrate including a display surface, a side surface continuous with the display surface, and an opposite side surface opposite to the side surface;

a display portion on the display surface;

a side wiring extending from the side surface to the display surface; and an opposite side wiring extending from the opposite side surface to the display surface, wherein the side wiring and the opposite side wiring are located without facing each other.

16. The display device according to claim 15, wherein the substrate includes a wiring at an edge of the display surface adjacent to the side surface, the wiring includes an end face adjacent to the side surface located inward from the side surface, and the end face is covered with the side wiring or covered with the side wiring and a protective layer covering the side wiring.

17. A multi-display, comprising:

a plurality of the display devices according to claim 15, wherein the plurality of display devices includes a first display device and a second display device, the side surface of the first display device and the opposite side surface of the second display device are adjacent to and face each other, and the side wiring in the first display device and the opposite side wiring in the second display device are located without facing each other.

18. The multi-display according to claim 17, wherein the side wiring and the opposite side wiring are electrically connectable to each other.

19. The multi-display according to claim 17, wherein the display portion includes at least one light emitter.

* * * * *